United States Patent [19]
Troost

[11] Patent Number: 5,529,612
[45] Date of Patent: Jun. 25, 1996

[54] METHOD AND SYSTEM FOR REMOVING VOLATILE ORGANICS FROM LANDFILL GAS

[75] Inventor: John R. Troost, St. Bernard Parish, La.

[73] Assignee: Southern Petroleum Laboratories, Inc., Houston, Tex.

[21] Appl. No.: 448,041

[22] Filed: May 23, 1995

[51] Int. Cl.$^6$ ................................................ B01D 53/14
[52] U.S. Cl. ........................ 95/184; 95/187; 95/209; 95/226; 95/227; 95/228; 95/237; 55/256; 55/267; 55/356
[58] Field of Search .............................. 55/228, 256, 267, 55/356; 62/17, 20; 95/179, 184, 187, 199, 209, 223, 226–228, 231, 237–240; 585/833, 866

[56] References Cited

U.S. PATENT DOCUMENTS

| | | | |
|---|---|---|---|
| 2,960,548 | 11/1960 | Ayers et al. .......................... | 585/866 |
| 3,779,904 | 12/1973 | Kubek et al. ......................... | 585/866 X |
| 3,788,980 | 1/1974 | Kubek et al. ......................... | 585/866 X |
| 4,302,220 | 11/1981 | Volkamer et al. .................... | 95/231 X |
| 4,518,396 | 5/1985 | Rawson ................................ | 95/231 X |
| 4,830,639 | 5/1989 | Grünewald et al. .................. | 95/237 X |
| 5,071,454 | 12/1991 | Streitberger et al. ................. | 95/237 |
| 5,073,669 | 12/1991 | Forte .................................... | 585/866 X |
| 5,078,759 | 1/1992 | Kira ...................................... | 95/226 X |
| 5,091,059 | 2/1992 | Berg ..................................... | 585/866 X |
| 5,209,762 | 5/1993 | Lowell .................................. | 95/237 X |
| 5,346,537 | 9/1994 | Lowell .................................. | 95/184 X |
| 5,453,114 | 9/1995 | Ebeling ................................. | 95/237 X |
| 5,462,583 | 10/1995 | Wood et al. .......................... | 95/237 X |

*Primary Examiner*—Robert Spitzer
*Attorney, Agent, or Firm*—N. Elton Dry

[57] ABSTRACT

A method for removing volatile organics from landfill gas, in which the landfill gas, which consists primarily of methane and contains volatile organic components, is passed through a quantity of liquid tetraglyme to cause the volatile organic components to be absorbed in the tetraglyme.

23 Claims, 2 Drawing Sheets

5,529,612

METHOD AND SYSTEM FOR REMOVING VOLATILE ORGANICS FROM LANDFILL GAS

TECHNICAL FIELD OF THE INVENTION

This invention relates in general to a method of removing pollutants from a gas. More specifically, the invention relates to a method of removing volatile organics from landfill gas.

BACKGROUND OF THE INVENTION

Gas generated through the decomposition of waste in landfills consists primarily of methane, along with volatile organic compounds. The volatile organic compounds can consist of hydrocarbons, which are relatively inert, or can be halogenated compounds containing chlorine, bromine, fluorine, or iodine, which are reactive. In addition, the volatile organic compounds may include aromatic hydrocarbons, such as benzene, toluene, xylene, and the like, which are classified as carcinogenic. The type and concentration of the volatile organic compounds can vary from site-to-site, depending upon the nature of the waste in the landfill.

It has been the practice, in the past, to vent the gas from the landfill. In a typical installation, a number of perforated wells or pipes are distributed throughout the landfill to collect the gas, and the gas is then conducted to a manifold or header for discharge from the landfill. As the landfill gas consists primarily of methane, it has been proposed to use the landfill gas as a fuel for gas aspirated internal combustion engines. The engines can be used at the landfill site for generating electricity or steam, pumping, or other functions. At a typical landfill there may be from two to six engines that are operating on the landfill gas.

The presence of certain volatile organic compounds in the landfill gas, particularly the halogenated compounds, can cause serious problems with the operation of internal combustion engines, Due to the reactivity of these compounds, they can react with other constituents to form acids which can attach or corrode engine bearings, bushings, valve guides and stems, as well as producing deposits on the valve seats, and deterioration of the engine oil.

Because of these potential problems with the use of landfill gas, there is a need for an efficient method for removing these volatile organic substances from the landfill gas.

SUMMARY OF THE INVENTION

The invention is directed to a method of removing impurities from a gas containing volatile organic compounds and particularly to a method of removing volatile organics from landfill gas which is primarily composed of methane. In accordance with the invention, a given volume of gas is passed through one or more absorption vessels, each containing a quantity of a polyethylene glycol ester, preferably tetraethylene glycol dimethyl ester (tetraglyme). The gas is percolated through the tetraglyme and the volatile organic compounds are absorbed in the tetraglyme.

To increase the efficiency of the absorption, it is preferred to chill the tetraglyme to a temperature below 0° C. and preferably in the range of about 0° C. to –30° C. The low temperature will minimize volatilization of certain volatile organic compounds that have low boiling points.

The gas purification system of the present invention comprises one or more absorption vessels containing a polyethylene glycol ester, a means for introducing a gas into each absorption vessel, a means for placing the gas into contact with the polyethylene glycol ester, a means for controlling the temperature of the polyethylene glycol ester, and a means for recovering the gas from the absorption vessels. The gas purification system may also contain additional elements such as a means for controlling the flow rate of the gas into the absorption vessels, a means for removing water from the gas prior to passing the gas through the absorption vessels, or a means for regenerating the polyethylene glycol ester after it has absorbed volatile organic compounds. The present invention may be consolidated onto a trailer, a truck, a cart, etc. to produce a portable gas purification system.

Tetraglyme, or other polyethylene glycol esters, have an affinity for volatile organic compounds and will extract these compounds from a gas stream that comes into contact with the tetraglyme. The present invention can serve to purify a gas with simplicity and low cost.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the claims of the invention.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF THE INVENTION

The present invention can provide an efficient, inexpensive means of removing volatile organic compounds from gas, particularly landfill gas.

Landfill gas has become increasingly popular recently as a fuel. The complicated nature of the composition of the landfill gas has not permitted the industry to delineate an on-site purification procedure to sufficiently remove the volatile organic compounds to produce a reliable fuel supply for internal combustion engines. Landfill gas consists primarily of methane, along with various volatile organic compounds and, in some cases, volatilized inorganic compounds. A typical landfill gas may contain halogenated volatile organic compounds, such as chlorobenzene, dichlorobenzene, dichlorethane, dichloroethene, chloromethane, methylene chloride, tetrachloroethane, trichloroethane, vinyl chloride, and the like. In addition, the landfill gas may also include aromatic hydrocarbons, such as benzene, styrene, toluene, xylene, and the like. Siloxane compounds, such as octamethyl cyclotetrasiloxane and decamethyl cyclopentasiloxane may also be present.

The halogenated volatile organic compounds are particularly troublesome when using the landfill gas as a fuel for an internal combustion engine. These compounds are reactive and can react with other constituents in the gas to form acids, which can corrode the bearings, bushings, and valve guides and stems of the engine. In addition, the halogenated organic compounds can also produce deposits on the valve seats, and can deteriorate the engine oil. Because of this, it is desirable to remove all volatile organic compounds from the landfill gas prior to using the gas as an engine fuel.

In a typical landfill operation, a number of perforated wells, or pipes, are located in a random pattern throughout the landfill and are used to collect the landfill gas. The wells are connected to a common manifold or header, and that gas is then distributed from the header to one or more engines that are located at the landfill site. In a typical installation, the suction side of a pump is connected to the manifold, and the gas is pumped, under pressure, by the pump to the engine. Before being introduced to the engine, the present invention can be used to remove moisture and volatile organic compounds from the landfill gas.

Figure 1:
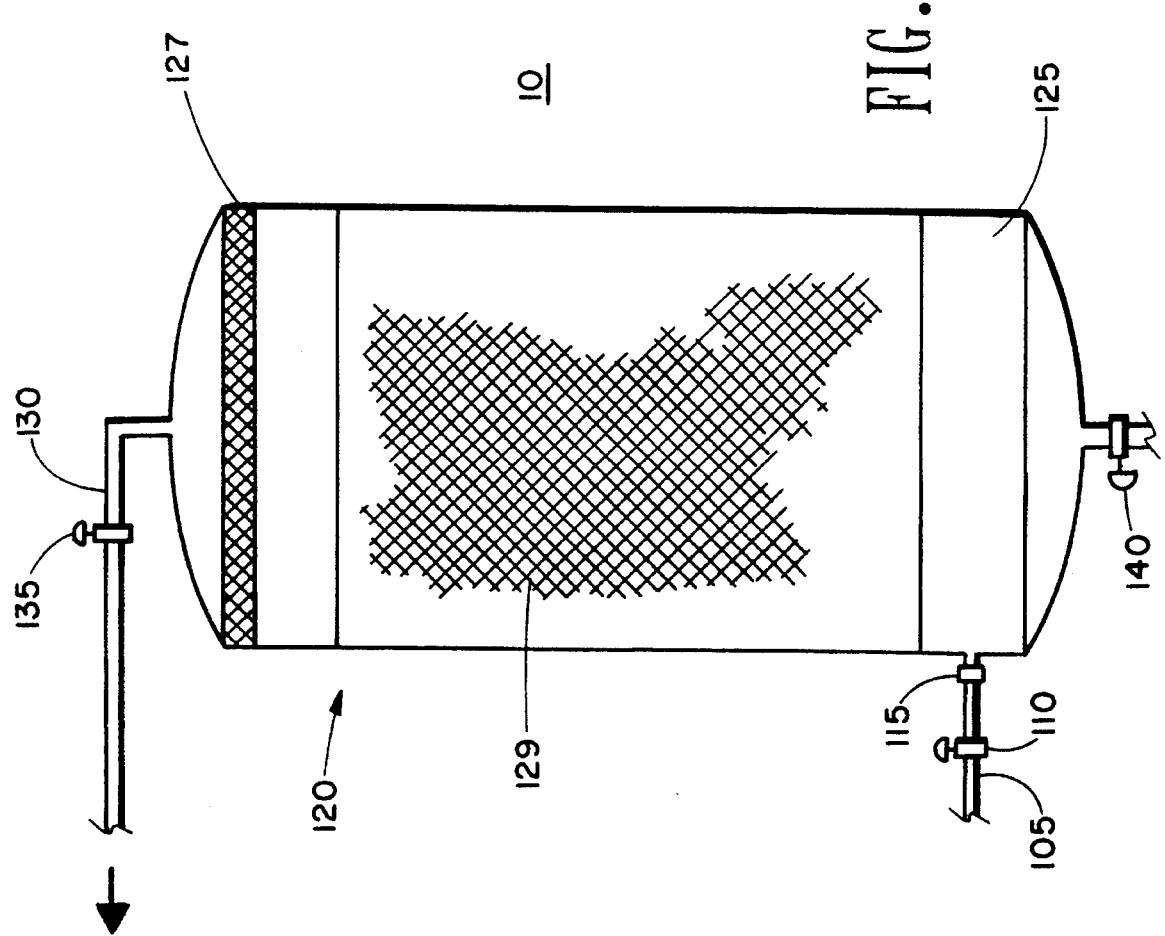
FIG. 1 is a diagrammatic view of one embodiment of a gas purification system.

FIG. 1 shows one embodiment of a gas purification device 10 which is used to remove water and volatile organic compounds from the gas. An inlet line 105 is connected to a gas source and a valve 110, is mounted in line 105, and serves to control the flow of the gas through line 105 to the absorption vessel 120.

Absorption vessel 120 contains a quantity of a polyethylene glycol ester 125, preferably tetraglyme (tetraethylene glycol dimethyl ester). Tetraglyme is an organic solvent, soluble in water, and has a boiling point of 276° C. Tetraglyme has a high affinity for polar and non-polar, low and high boiling, halogenated and non-halogenated, aromatic and aliphatic compounds.

Absorption vessel 120 is constructed such that all incoming gas is percolated through the polyethylene glycol ester. A variety of known constructions can accomplish this goal, as for example an absorption vessel with a circulating polyethylene glycol ester where the gas is dispersed in the polyethylene glycol ester by introducing the gas through one or more diffusers 129.

As shown in FIG. 1, line 105 is connected to a fitting 115, preferably mounted in the lower end of absorption vessel 120. Gas is introduced into absorption vessel 120 and is percolated through the polyethylene glycol ester 125, preferably tetraglyme. As the gas is circulated through the tetraglyme in the absorption vessel 120, water and the volatile organic compounds will be absorbed in the tetraglyme. Inorganic contaminants of the gas are also absorbed by the tetraglyme if the inorganics are present in a vaporized form, or attached to air borne particulates.

The gas will circulate through the polyethylene glycol ester and rise to the top of the polyethylene glycol ester. As the gas rises it will accumulate in the headspace 127 of absorption vessel 120, so that it can be discharged from the upper end of absorption vessel 120 through a discharge line 130. Discharge line 130 contains a valve 135 that can be used to control the release of the purified gas.

More than one absorption vessel 120 may be interconnected so that impurities not absorbed by the first absorption vessel 120 will be absorbed in the second or third absorption vessel. When more than one absorption vessel is used in the present invention the different absorption vessels may contain different polyethylene glycol esters. Furthermore, each absorption vessel may be maintained at a different temperature. One skilled in the art would be able to select the polyethylene glycol esters and the temperature of operation for each absorption vessel to maximize the extraction of impurities from the gas.

Once the absorption limit of the tetraglyme, or other polyethylene glycol ester, is surpassed, the tetraglyme can be removed from the absorption vessel through a release valve 140 and replaced with fresh polyethylene glycol ester. The timing of the replacement of tetraglyme may be calculated based on an analysis of gas contaminants and the quantity of gas purified through the gas purification system during any given time, or the tetraglyme may be replaced at regular timed intervals selected to precede the absorption limits of the tetraglyme.

Figure 2:
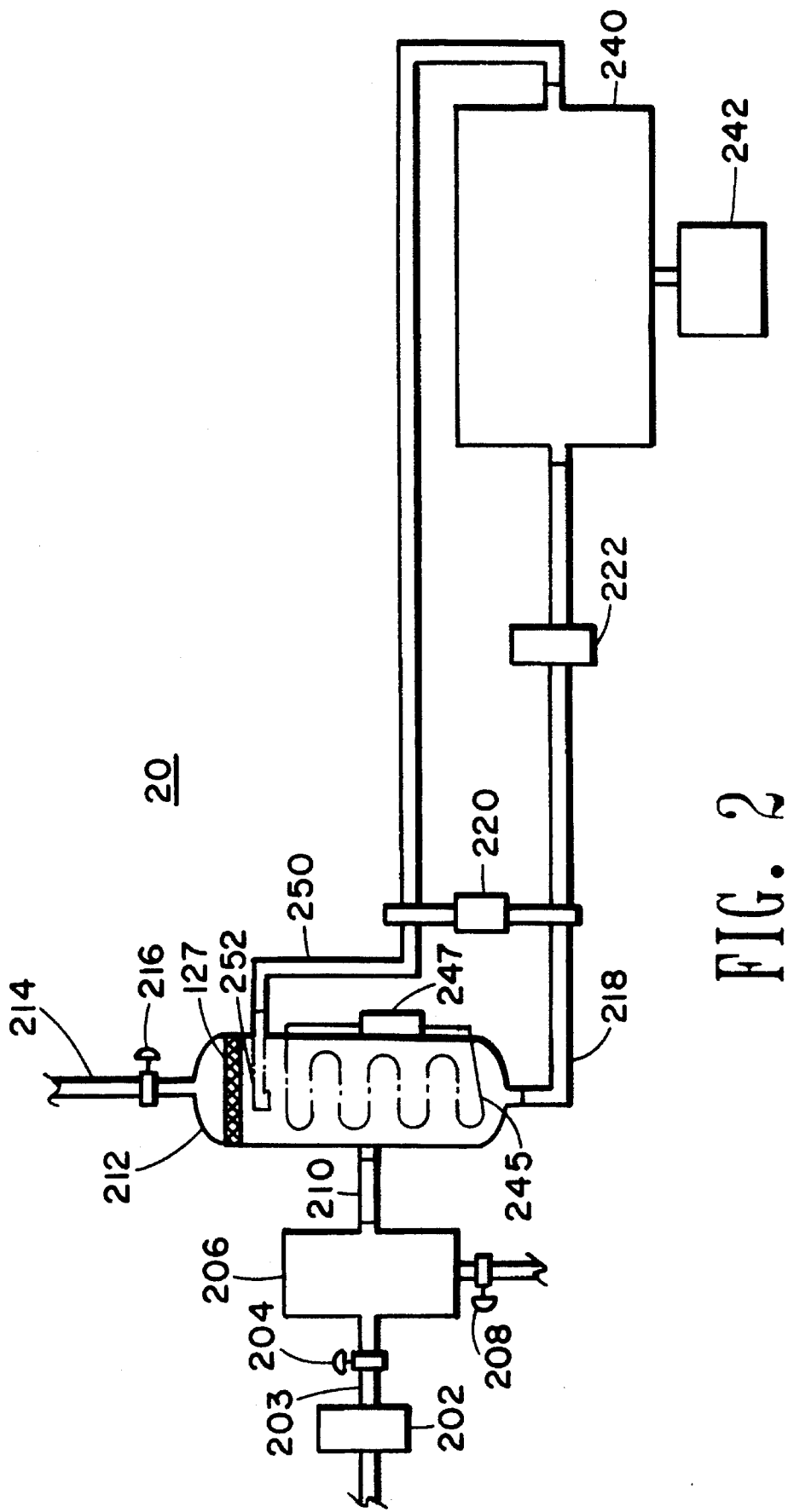
FIG. 2 shows a preferred embodiment of a gas purification system.

FIG. 2 shows a preferred embodiment of the gas purification system. According to this embodiment, a gas is introduced at a controlled flow rate into a water separator 206. If the gas is pressurized a controlled flow rate may be maintained with inlet valve 204 mounted in fill line 203 through which the gas is introduced. If the gas is not pressurized the flow rate of the gas may be controlled through the use of pump 202 and inlet valve 204.

In this embodiment, the gas is initially passed through a water separator 206, where water vapor is removed from the gas. A person skilled in the art will recognize a variety of useful techniques for dehumidifying the gas, such as passing the gas through a condenser, or a vessel filled with a dehydrating agent. Water that accumulates in the water separator 206 may be removed from water separator 206 via outlet 208.

After the gas has been dehydrated, the gas passes through line 210 into absorption vessel 212. Absorption vessel 212 contains a polyethylene glycol ester, preferably tetraglyme. The gas may be passed through one or more absorption vessels 212, in order to remove impurities from the gas.

Absorption vessel 212 may be constructed in a variety of ways to ensure contact between the gas being pumped into the absorption vessel and the tetraglyme contained therein. It has been found that the retention of the volatile organic compounds by the tetraglyme in absorption vessel 212 may be improved by maintaining the tetraglyme at a low temperature, preferably 0° C.–30° C. This reduced temperature can be achieved in a number of ways such as by circulating a cooled refrigerate around absorption vessel 212. In this embodiment absorption vessel 212 would be surrounded by a jacket 245 through which refrigerant could be pumped by means of a pump 247. Other cooling methods will be apparent to one skilled in the art.

The purified gas, after its impurities have been absorbed by the tetraglyme in the absorption vessel, is released from the absorption vessel through outlet 214. The rate of discharge of the purified gas may be regulated through the use of discharge valve 216.

The gas purification system of the present invention may also include a tetraglyme regenerator 240. One embodiment of a regeneration system is shown in FIG. 2 where tetraglyme can be removed from the absorption vessel 212, pumped through line 218 by pump 220, filtered through a filter unit 222 to remove particulates, and directed into regenerator 240.

A preferred embodiment of regenerator 240 will remove the volatile organic compounds from the tetraglyme by heating the tetraglyme to selectively volatize the lower boiling point volatile organics. The volatized organics can be removed as a vapor and burned in a vapor control device 242. Alternative embodiments of the vapor control device 242 may condense the vapors driven off when the tetraglyme is heated.

Once the volatile organic compounds have been removed from the tetraglyme, the tetraglyme can be added back to the absorption vessel 212 by passing the regenerated tetraglyme through line 250, and into absorption vessel 212 through inlet 252. During the regeneration process, the tetraglyme removed from the absorption vessel should approximate the quantity of tetraglyme added back into the absorption vessel. Pump 220 may be set to balance tetraglyme outflow with inflow.

The entire gas purification system illustrated in FIG. 1 or FIG. 2 may be placed on a trailer, a truck, or hand cart so that it is easily moved from one location to another. The gas purification system may be directly connected to an internal combustion engine, or the gas purification system may be connected to a manifold that collects gas from more than one landfill site.

Although the present invention and its advantages have been described in detail, it should be understood that various changes, substitutions and alterations can be made herein without departing from the spirit and scope of the invention as defined by the appended claims.

What is claimed is:

1. A method of purifying a gas containing volatile organic compounds, comprising the step of passing the gas through a quantity of liquid polyethylene glycol ester to cause the volatile organic compounds to be absorbed in the polyethylene glycol ester.

2. The method of claim 1, wherein the polyethylene glycol ester is maintained at a temperature below 0° C. when the gas is passed through said polyethylene glycol ester.

3. The method of claim 1, wherein the polyethylene glycol ester is contained in an absorption vessel, and said step of passing the gas through the polyethylene glycol ester comprises percolating the gas through the polyethylene glycol ester in said absorption vessel.

4. The method of claim 1, wherein the polyethylene glycol ester is contained in a plurality of absorption vessels, and said step of passing the gas through the polyethylene glycol ester comprising percolating the gas through each of said absorption vessels.

5. The method of claim 1 wherein said polyethylene glycol ester is tetraglyme.

6. The method of claim 1, further comprising the step of removing water vapor from said gas prior to passing said gas through said polyethylene glycol ester.

7. The method of claim 1, further comprising the step of purifying the liquid polyethylene glycol ester to remove entrapped impurities, and then recycling the ester for use in absorbing said volatile organic compounds.

8. A method for removing volatile organic compounds from a gas, said method comprising the following steps:

removing water vapor from said gas; and introducing said gas at a controlled flow rate into an absorption vessel, wherein said gas percolates through a polyethylene glycol ester contained within said absorption vessel;

the polyethylene glycol ester then absorbing at least a portion of volatile organic compounds from said gas.

9. The method of claim 8 further comprising the steps of:

removing at a controlled rate said polyethylene glycol ester from said absorption vessel subsequent to said polyethylene glycol ester absorbing volatile organic compounds from said gas;

regenerating said polyethylene glycol ester by removing said volatile organic compounds from said polyethylene glycol ester; and introducing said regenerated polyethylene glycol ester into said absorption vessel at a rate equal to the rate of removal of said polyethylene glycol ester from said absorption vessel.

10. The method of claim 8, wherein the polyethylene glycol ester is maintained at a temperature below 0° C. when the gas is passed through said polyethylene glycol ester.

11. The method of claim 8, wherein said polyethylene glycol ester is tetraglyme.

12. An apparatus for extracting volatile organic impurities from a gas; said apparatus comprising:

an absorption vessel, said absorption vessel containing a quantity of a polyethylene glycol ester;

means for introducing said gas into said absorption vessel;

means for placing said gas in contact with said polyethylene glycol ester; and means for recovering said gas from said absorption vessel, subsequent to contact with said polyethylene glycol ester.

13. The apparatus of claim 12, further comprising means for controlling the flow rate of said gas into said absorption vessel.

14. The apparatus of claim 12, further comprising means for controlling the temperature of said polyethylene glycol ester.

15. The apparatus of claim 12, wherein said polyethylene glycol ester is tetraglyme.

16. The apparatus of claim 12, further comprising means for housing said apparatus, whereby said apparatus is portable.

17. An apparatus for extracting volatile organic impurities from a gas; said apparatus comprising:

a plurality of absorption vessels, each absorption vessel containing a quantity of a polyethylene glycol ester;

means for serially introducing said gas into each absorption vessel;

means for placing said gas in contact with said polyethylene glycol ester of each absorption vessel; and means for recovering said gas from said absorption vessels subsequent to contact between said gas and each polyethylene glycol ester.

18. The apparatus of claim 17, further comprising means for controlling the flow rate of said gas into said absorption vessels.

19. The apparatus of claim 17, further comprising means for removing water from said gas prior to passing said gas through said absorption vessels.

20. The apparatus of claim 17, further comprising means for regenerating said polyethylene glycol ester.

21. The apparatus of claim 17 wherein at least one absorption vessel contains a quantity of tetraglyme.

22. The apparatus of claim 17 wherein each said absorption vessels contains a different polyethylene glycol ester.

23. The apparatus of claim 17 further comprising means for controlling the temperature of said polyethylene glycol esters.

* * * * *